US010761688B2

(12) United States Patent
Li et al.

(10) Patent No.: US 10,761,688 B2
(45) Date of Patent: Sep. 1, 2020

(54) METHOD AND APPARATUS FOR EDITING OBJECT

(71) Applicant: BEIJING XIAOMI MOBILE SOFTWARE CO., LTD., Beijing (CN)

(72) Inventors: Lan Li, Beijing (CN); Jiayan Li, Beijing (CN); Zhenzhou Lu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/122,832

(22) Filed: Sep. 5, 2018

(65) Prior Publication Data

US 2019/0073095 A1 Mar. 7, 2019

(30) Foreign Application Priority Data

Sep. 7, 2017 (CN) .......................... 2017 1 0801843

(51) Int. Cl.
*G06F 17/00* (2019.01)
*G06F 3/0482* (2013.01)
(Continued)

(52) U.S. Cl.
CPC .......... *G06F 3/0482* (2013.01); *G06F 3/0484* (2013.01); *G06F 3/04886* (2013.01); *G06F 40/166* (2020.01); *H04M 1/72583* (2013.01)

(58) Field of Classification Search
CPC .......................... H04M 1/72583; G06F 17/24; G06F 9/44526; G06F 3/0482; G06F 3/0484; G06F 3/04886; G06F 40/166
See application file for complete search history.

(56) References Cited

U.S. PATENT DOCUMENTS

| 8,201,109 | B2* | 6/2012 | Van Os | G06F 3/0488 715/710 |
| 8,635,551 | B1* | 1/2014 | Su | G01R 13/0272 345/440 |
| 8,768,965 | B2* | 7/2014 | Kimball | G06F 3/0481 707/784 |

(Continued)

FOREIGN PATENT DOCUMENTS

| CA | 2911850 A1 * | 5/2016 | ......... G06F 3/04886 |
| CA | 2911850 A1 | 5/2016 | |

OTHER PUBLICATIONS

European Extended Search Report issued in EP Patent Application No. 18193213.8, dated Dec. 19, 2018, 8 pages.

(Continued)

*Primary Examiner* — Laurie A Ries
(74) *Attorney, Agent, or Firm* — Arch & Lake LLP

(57) ABSTRACT

The present disclosure discloses a method and an apparatus for editing an object. The method includes: displaying a navigation bar and a user interface of an application in a terminal device, where the navigation bar is a control for displaying n virtual buttons provided by an operating system of the terminal device, and n is a positive integer; when an editable object exists in the user interface, displaying an editing control interface corresponding to the editable object in the navigation bar; receiving a first signal, where the first signal is generated according to a first designated operation triggered by the editing control interface; and performing an editing operation corresponding to the first signal for the editable object.

20 Claims, 11 Drawing Sheets

(51) Int. Cl.
*G06F 3/0488* (2013.01)
*G06F 3/0484* (2013.01)
*H04M 1/725* (2006.01)
*G06F 40/166* (2020.01)

(56) References Cited

U.S. PATENT DOCUMENTS

| | | | | |
|---|---|---|---|---|
| 8,972,867 | B1* | 3/2015 | Pavley | G11B 27/034 |
| | | | | 715/723 |
| 10,372,807 | B1* | 8/2019 | Greenbaum | G06Q 40/00 |
| 2008/0208446 | A1* | 8/2008 | Geelen | G01C 21/3655 |
| | | | | 701/533 |
| 2009/0187530 | A1* | 7/2009 | Nair | G06F 16/83 |
| 2011/0202882 | A1* | 8/2011 | Forstall | G06F 3/04883 |
| | | | | 715/835 |
| 2011/0276601 | A1* | 11/2011 | Pin | G06F 16/28 |
| | | | | 707/783 |
| 2012/0216140 | A1* | 8/2012 | Smith | G06F 3/0481 |
| | | | | 715/780 |
| 2013/0305133 | A1* | 11/2013 | Freedman | G06F 17/215 |
| | | | | 715/209 |
| 2015/0112857 | A1* | 4/2015 | Gellis | G06Q 50/01 |
| | | | | 705/39 |
| 2015/0186008 | A1* | 7/2015 | Hicks | G06F 3/04817 |
| | | | | 715/765 |
| 2017/0322778 | A1* | 11/2017 | Gupta | G06F 16/24524 |
| 2018/0173386 | A1* | 6/2018 | Adika | G06F 16/957 |
| 2019/0278475 | A1* | 9/2019 | Adderly | G06F 3/04886 |

OTHER PUBLICATIONS

Pc shastra: "Copy Multiple Text and Paste 6,13 at a time in MS Word", YouTube, Aug. 12, 2015 p. 1, retrieved from the Internet: URL:https://www.youtube.com/watch?v=JuiZJ64CMRk [retrieved on Dec. 10, 2018].

* cited by examiner

METHOD AND APPARATUS FOR EDITING OBJECT

CROSS-REFERENCE TO RELATED APPLICATIONS

This application is based on and claims priority to Chinese patent application No. 201710801843.5 filed on Sep. 7, 2017. The entire content of which is hereby incorporated by reference for all purposes.

TECHNICAL FIELD

The present disclosure relates to the field of computer technology, and in particular, to a method and an apparatus for editing an object.

BACKGROUND

In a display screen of a terminal device, the navigation bar is a strip-shaped region with virtual buttons at the bottom. The virtual buttons in the navigation bar provide at least one function of returning to a previous level, returning to a home screen and multitasking management.

When a demo application such as a document reader, a picture viewer, an audio player, a video player and the like of a terminal presents an interface containing an editable object, and when the editable object needs to be edited, the terminal may require the user to click a home button in the navigation bar, and then select and open a desired editing application from the home page, and open the editable object in the editing application to edit the editable object. For example, when the terminal browses a text A through a text reading application, and when the user wishes to edit the text A, the terminal needs to return to the home page, and then accepts an opening operation of the text editing application in the home page, and opens the text A in the text editing application, thus to complete the editing of the text A.

SUMMARY

The example of the present disclosure provides a method, an apparatus and a non-transitory computer readable medium for editing an object.

According to a first aspect of the example of the present disclosure, there is provided a method for editing an object. The method may include: displaying a navigation bar and a user interface of an application in a terminal device, where the navigation bar is a control for displaying n virtual buttons provided by an operating system of the terminal device, and n is a positive integer; when an editable object exists in the user interface, displaying an editing control interface corresponding to the editable object in the navigation bar; receiving a first signal, where the first signal is generated according to a first designated operation triggered by the editing control interface; and performing an editing operation corresponding to the first signal for the editable object.

According to a second aspect of the present disclosure, there is provided an apparatus for editing an object. The apparatus may include: a processor; and a memory for storing processor executable instructions, where the processor may be configured to: display a navigation bar and a user interface of an application in a terminal device, where the navigation bar is a control for displaying n virtual buttons provided by an operating system of the terminal device, and n is a positive integer; when an editable object exists in the user interface, display an editing control interface corresponding to the editable object in the navigation bar; receive a first signal, where the first signal is generated according to a first designated operation triggered by the editing control interface; and perform an editing operation corresponding to the first signal for the editable object.

According to a third aspect of the present disclosure, there is provided a non-transitory computer-readable storage medium. At least one instruction may be stored in the computer-readable storage medium, and the instruction may be loaded and executed by a processor to implement displaying a navigation bar and a user interface of an application in a terminal device, where the navigation bar is a control for displaying n virtual buttons provided by an operating system of the terminal device, and n is a positive integer; when an editable object exists in the user interface, displaying an editing control interface corresponding to the editable object in the navigation bar; receiving a first signal, where the first signal is generated according to a first designated operation triggered by the editing control interface; and performing an editing operation corresponding to the first signal for the editable object.

It is to be understood that both the foregoing general description and the following detailed description are exemplary and explanatory only and are not restrictive of the disclosure.

BRIEF DESCRIPTION OF THE DRAWINGS

The accompanying drawings herein are incorporated in and constitute a part of this specification, illustrate examples consistent with the present disclosure, and together with the description serve to explain the principles of the present disclosure.

DETAILED DESCRIPTION

Examples will be described in detail herein, examples of which are illustrated in the accompanying drawings. The following description refers to the accompanying drawings. Unless otherwise indicated, like numerals in different drawings indicate the same or similar elements. The examples described herein do not represent all examples consistent with the present disclosure. Instead, they are merely examples of apparatuses and methods consistent with some aspects of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

"Modules" mentioned herein refer to programs or instructions stored in memory that are capable of realizing certain functions. "A plurality of" mentioned herein refers to two or more. "And/or" describes the association relationship of related objects, and indicates that there may be three relationships. For example, A and/or B may indicate that: A exists alone, A and B exist simultaneously, and B exists alone. The character "/" generally indicates that the related objects is an "or" relationship.

In the example of the present disclosure, a method for editing an object may be applied in a terminal. The terminal includes a smart phone, a tablet computer, an e-book reader, an MP3 (Moving Picture Experts Group Audio Layer III) player, an MP4 (Moving Picture Experts Group Audio Layer IV) player, a laptop portable computer, a personal computer (PC), and the like. Optionally, an operating system that provides a navigation bar runs in the terminal. In the example, the operating system includes but is not limited to an Android system or a customized system developed based on the Android system.

Figure 1:
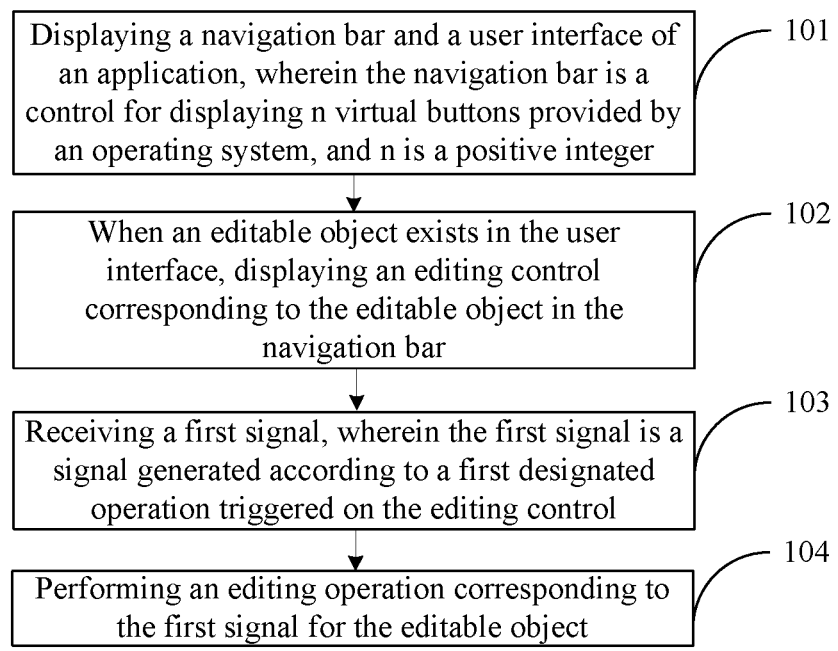
FIG. 1 is a flowchart of a method for editing an object provided by an example of the present disclosure.

Please refer to FIG. 1, which is a flowchart of a method for editing an object provided by an example of the present disclosure. The method may be applied to the above terminal. As shown in FIG. 1, the method for displaying an editing control may include the following steps.

In step 101, a navigation bar and a user interface of an application are displayed, wherein the navigation bar is a control for displaying n virtual buttons provided by an operating system, and n is a positive integer.

In the example of the present disclosure, the navigation bar is a region provided by an operating system and presented as a strip shape. In the region, virtual buttons provided by the operating system are displayed. When different virtual buttons are triggered, different system functions may be implemented. For example, the virtual button includes a return key, a home key and a menu key. The return key is used to implement a system function of returning to a previous level. The home key is used to implement a function of switching to a home page. The menu key is used to implement a function of unfolding a menu of applications that are currently running.

In the present disclosure, the number of virtual buttons displayed in the navigation bar is a positive integer. In addition, due to a limited size of a terminal screen, the number of virtual buttons that may be simultaneously displayed in the screen usually has an upper limit value for different terminals. For example, n virtual button controls are displayed in the navigation bar of the terminal, wherein n is a positive integer. The minimum of n may be 1, and an upper limit value of n may be set to 5 due to the limited length of a bottom edge of the terminal.

Optionally, a maximum width of the navigation bar has an upper limit value due to a limited width of the screen, and the height of the navigation bar may be adjusted within a certain range to make that at least two rows of virtual button controls may be displayed in the navigation bar. The present example does not limit the specific display manner of the navigation bar.

In the example of the present disclosure, the operating system displays the navigation bar and the user interface of the application side by side, so that the user may see a content displayed in the navigation bar while seeing the complete user interface. Alternatively, the operating system may also place the navigation bar on the upper layer at the bottom of the user interface for display. When the navigation bar is displayed on the upper layer at the bottom of the user interface, the navigation bar may be displayed semi-transparently.

In step 102, when an editable object exists in the user interface, an editing control corresponding to the editable object in the navigation bar is displayed.

In example of the present disclosure, the editable object may be texts, pictures, video clips, audio clips or other editable objects. In the example, the user interface belongs to an application that is running in the foreground and is used to display an editable object.

For example, when the editable object is a text, the target application may be an application for displaying a text, such as a social application, a news application, a reading application, a mailbox application or a memo application, and the like. When the editing object is a picture, the target application may be an application for displaying a picture, such as a photo album application, a social application, or a news application, and the like. When the editing object is a video clip or an audio clip, the target application may be a player-like application, such as a video play application or an audio play application.

Optionally, different operable objects correspond to different editing operations. The editable object may be implemented as a text, a picture, a video, an audio, or other editable object, and editing operations corresponding to different editable objects are different. Therefore, the operating system of the terminal will generate a corresponding editing control according to different operating objects.

Optionally, the object type of the editable object may be a single type. For example, the editable object is a pure text and the object type is a text type, or the editable object is a pure picture and the object type is a picture type.

Optionally, the object type of the editable object may also be a mixed type, which refers to an object type that contains two or more objects. For example, in a news article provided by a news application, a news article that is an editable object includes texts, pictures and videos, and then the object type of the editable object is a mixed type, and objects contained by the mixed type includes texts, pictures and videos.

Optionally, the editing control may be at least one of a text pasting control, a text copying control, a bold control, a left alignment control, a right alignment control, a center alignment control and a brush control. The brush control is used to scrawl texts or drawings in the user interface. In the example, when the editable object is text, the editing tool may include font, font size, font color, highlight color, annotation, graffiti, bold text, text underline, italic, left alignment, right alignment, center alignment, and justify alignment, distributed alignment, or the like. Optionally, when the editable object is a picture, the editing tool may include resizing, rotating, flipping, adding texts, adding picture pendants, adjusting contrast, adjusting brightness, or the like. Optionally, when the editable object is a video, the editing tool may include a timeline, mirror flipping, clipping, adding texts, or adding a picture. Optionally, when the editable object is an audio, the editing tool may include a timeline, clip, ascending, descending, or the like.

In the example of the present disclosure, the editing control may be a visualized icon, and the visualized icon is displayed in the navigation bar.

In step 103, a first signal is received, wherein the first signal is a signal generated according to a first designated operation triggered on the editing control.

The terminal may accept a first designated operation for the editing control from the user. In the example, the first designated operation may be a short press touch, a long press touch, a leftward slide, a rightward slide, an upward slide, a downward slide, or the like.

Optionally, for the terminal capable of distinguishing values of the pressing pressures, the first designated operation may also be an operation of a light press, a heavy press, or the like.

In step 104, an editing operation corresponding to the first signal is performed for the editable object.

In the example, the operating system in the terminal performs an editing operation corresponding to the first signal for the editable object. The first signal may preset corresponding editing operations in the operating system. When receiving the first signal, the operating system determines the corresponding editing operation according to the preset correspondence between the first signal and the editing operation.

Optionally, the editing operation may be performed by an Application Programming Interface (API) or may be performed by the operating system.

In summary, in the method for editing an object provided in the example of the present disclosure, by displaying a navigation bar and a user interface of an application, when an editable object exists in the user interface, an editing control corresponding to the editable object is displayed in the navigation bar, a first signal generated according to a first designated operation triggered on the editing control is received, and an editing operation corresponding to the first signal is performed for the editable object. Since an editing control is additionally displayed in the navigation bar, the user may directly edit the editable object through the edit control on the navigation bar, thereby the operation of opening the editing application and editing the editable object in the editing application may be eliminated. Therefore, the method for editing an object provided by the present disclosure reduces operation of the user and improves human-machine interaction efficiency when the user edits the object.

In the method for editing an object provided in the example of the present disclosure, the editing control may be displayed simultaneously with at least one of a return key, a home key and a menu key in the navigation bar or may be displayed by replacing the virtual buttons originally displayed in the navigation bar. The scheme of the editing control replacing the virtual button originally displayed in the navigation bar will be described below with reference to FIG. 2.

Figure 2:
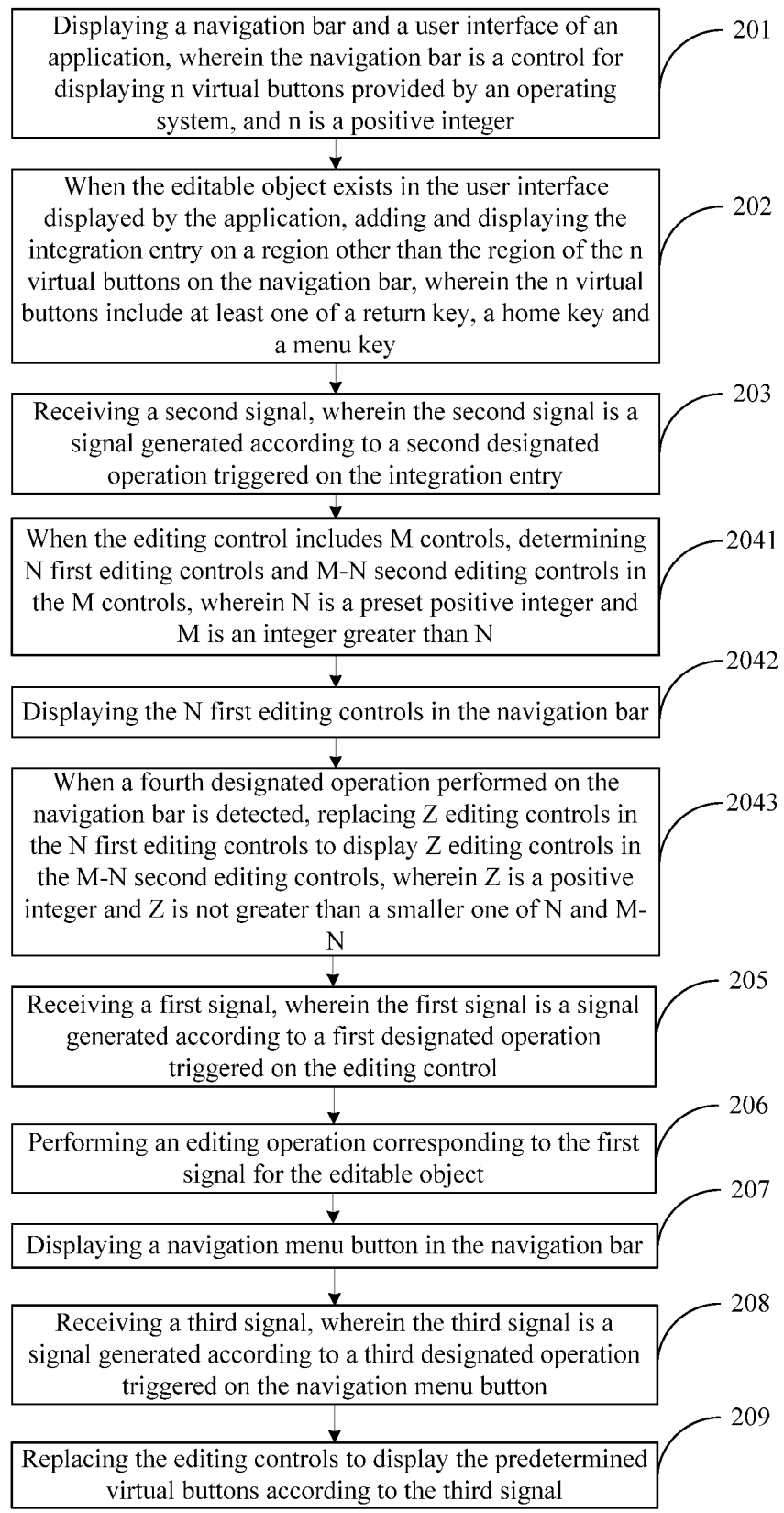
FIG. 2 is another flowchart of a method for editing an object provided by an example of the present disclosure.

Please refer to FIG. 2, which is another flowchart of a method for editing an object provided by an example of the present disclosure. The method may be used in the above terminal. As shown in FIG. 2, the method for editing an object may include following steps.

In step 201, a navigation bar and a user interface of an application are displayed, wherein the navigation bar is a control for displaying n virtual buttons provided by an operating system, and n is a positive integer.

In the example of the present disclosure, the execution procedure of step 201 is the same as that of step 101. For details, please refer to the execution procedure of step 101, which will not be described herein again.

In step 202, when an editable object exists in the user interface displayed by the application, an integration entry is added and displayed on a region other than regions of the n virtual buttons on the navigation bar, wherein the n virtual buttons include at least one of a return key, a home key and a menu key.

The operating system has an ability to identify attributes of objects in the user interface. The properties of the object include information indicating whether the object may be edited, and the operating system may determine whether an editable object exists in the current interface by recognizing the information.

When the editing control includes at least two editing controls, and when the operating system determines that an editable object exists in the current user interface, the integration entry may be added and displayed on a region other than regions of the n virtual buttons on the navigation bar. Taking n virtual buttons as a reference, the integration entry may be displayed in the left or right region of the above n virtual buttons. Optionally, the integration entry may also be displayed at a certain location between the above n virtual buttons.

It should be noted that the integration entry may be used to integrate the editing controls that need to be displayed in the navigation bar. The integration entry may be displayed as a visual icon in the navigation bar.

Optionally, when the above-mentioned editing control is a single control, the operating system may not display the above-mentioned integration entry, but directly display the editing control at the location of the above integration entry. Alternatively, when the above editing control is a single control, the operating system may also display the above integration entry.

Optionally, the editable object is an object in an editable state in the user interface displayed by the application. Alternatively, the editable object may be all objects of a specified type in the user interface displayed by the application. Alternatively, the editable object may be an object of a specified type in a selected state in the user interface.

Optionally, the controls of the n virtual buttons provided by the operating system displayed in the navigation bar include at least one of a return button, a home button, a menu button or a status bar drop button.

In step 203, a second signal is received, wherein the second signal is a signal generated according to a second designated operation triggered on the integration entry.

The operating system may detect the second designated operation of the user for the integration entry. Similar to the first designated operation, the second designated operation may also be a short press touch, a long press touch, a leftward slide, a rightward slide, an upward slide, a downward slide, or the like.

Optionally, for the terminal capable of distinguishing values of the pressing pressures, the second designated operation may also be an operation of light press, heavy press, or the like.

When the second designated operation is detected, the operating system will receive the second signal generated according to the second designated operation.

In step 204, a predetermined virtual button of the n virtual buttons is replaced to display an editing control according to the second signal.

When the editing control includes at least two editing controls, after receiving the second signal, the operating system may display the at least two editing controls in the navigation bar according to the second signal and replace the originally displayed predetermined virtual button. For example, if three virtual buttons, i.e., a return button, a home button and a menu button, are displayed in the navigation bar originally, the operating system will replace the above three virtual buttons with at least two editing controls according to the second signal.

Figure 3A:
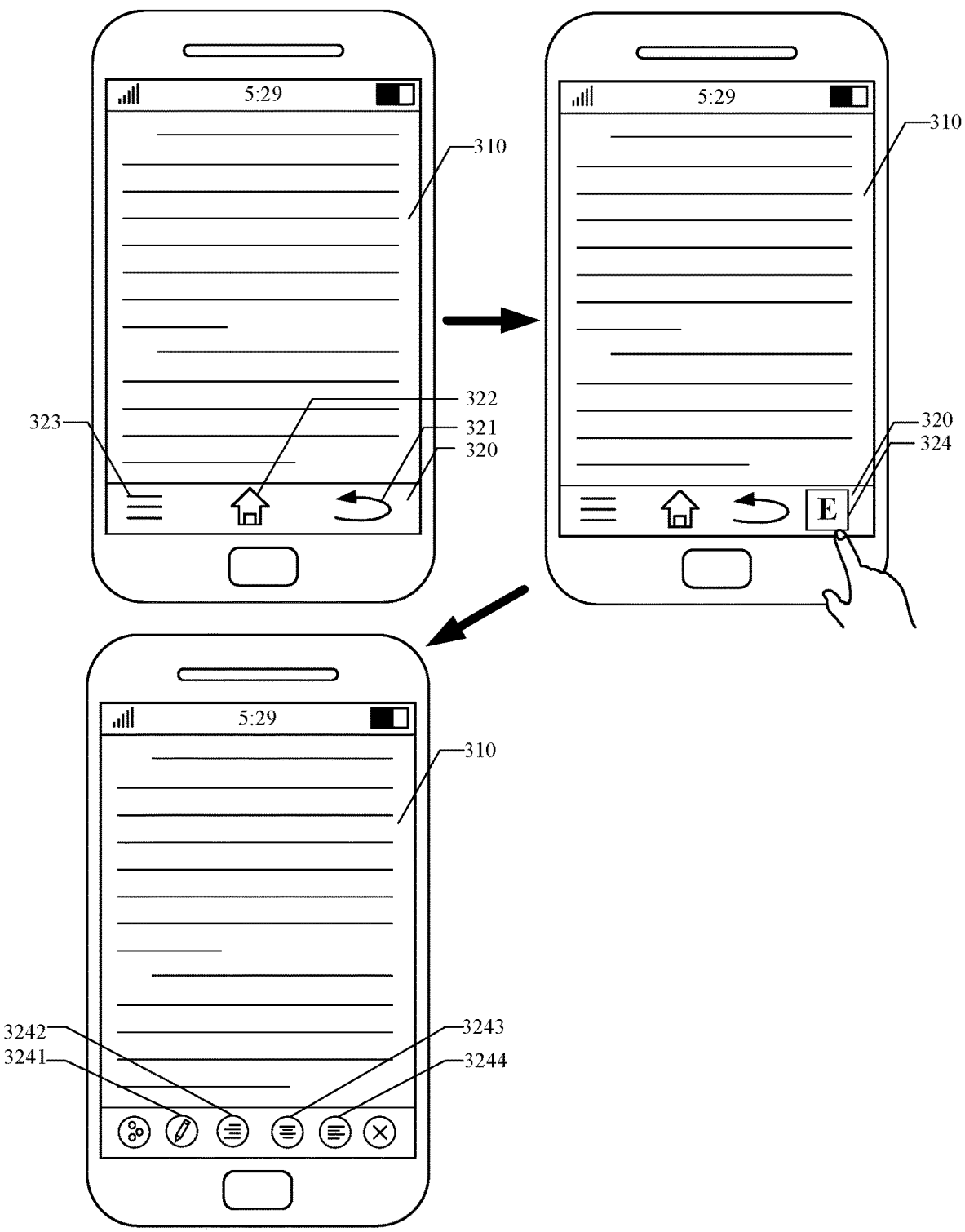
FIG. 3A is a schematic diagram of displaying an editing control provided based on the example shown in FIG. 2.

For example, please refer to FIG. 3A, which is a schematic diagram of displaying an editing control provided based on the example shown in FIG. 2. In FIG. 3A, the user interface 310 is a user interface of a novel reading application P1. A navigation bar 320 is displayed together with the user interface 310, and three virtual buttons are displayed in the navigation bar 320, namely a return key 321, a home key 322, and menu key 323. When the operating system detects that there is an editable object, such as an editable text, exists in the user interface 310, the operating system will add and display an integration entry 324 on a region other than regions of the above three virtual buttons in the navigation bar 320. At this time, the user may click the integration entry 324 by a finger, the operating system generates a second signal according to the click action (a second designated operation), and replaces the return key 321, the home key 322 and the menu key 323, with a brush control 3241, a right alignment control 3242, a center alignment control 3243 and a left alignment control 3244.

In the example of the present disclosure, the step 204 may also be replaced by step 2041, step 2042 and step 2043, to implement the effect of replacing the predetermined virtual button among the n virtual buttons to display the editing control in the step 204.

In step 2041, when the editing control includes M controls, N first editing controls and M-N second editing controls in the M controls are determined, wherein N is a preset positive integer and M is an integer greater than N.

In the example, a value of N may be determined by the maximum number of editing controls that may be simultaneously displayed in the navigation bar. For example, when the navigation bar may display at most 5 editing controls at the same time, the value of N is 5.

In practical applications, the region that may be displayed in the navigation bar is limited, and at most N controls may be displayed at the same time, for example, up to 5 editing controls may be displayed. When the number M of editing controls that need to be displayed is greater than N, the operating system cannot display all editing controls in the navigation bar at one time. At this time, the operating system may determine the N editing controls in the M controls as the first editing control and determine the remaining M-N controls as the second editing control.

In step 2042, the N first editing controls are displayed in the navigation bar.

In step 2043, when a fourth designated operation performed on the navigation bar is detected, Z editing controls in the N first editing controls are replaced to display Z editing controls in the M-N second editing controls, wherein Z is a positive integer and Z is not greater than a smaller one of N and M-N.

In examples of the present disclosure, the fourth designated operation may be a leftward slide, a rightward slide, an upward slide or a downward slide on the navigation bar. When the operating system detects the fourth designated operation, the Z editing controls in the N first controls currently displayed in the navigation bar are replaced to display Z editing controls in the M-N editing controls.

In the example of the present disclosure, when the display space for accommodating the editing controls in the navigation bar is limited, the navigation bar cannot display all the editing controls at the same time. When the navigation bar switches from the currently displayed editing controls to other editing controls, different replacing manners may be available, such as individual replacement, sliding replacement or entire page replacement. Among them, the entire page replacement is that, in the fourth operation, the currently displayed editing controls in the entire navigation bar are replaced by another page of editing controls entirely. For example, when a total of five editing controls a, b, c, d, and e are displayed in the current navigation bar, and when the operating system detects the fourth designated operation on the navigation bar, the operating system moves a total of the five editing controls a to e out of the navigation bar, then displaying other editing controls for editable objects in the navigation bar.

The individual replacement of the editing control is illustrated in the following by taking FIG. 3B as an example, and the sliding replacement of the editing control is illustrated in the following by taking FIG. 3C as an example.

Figure 3B:
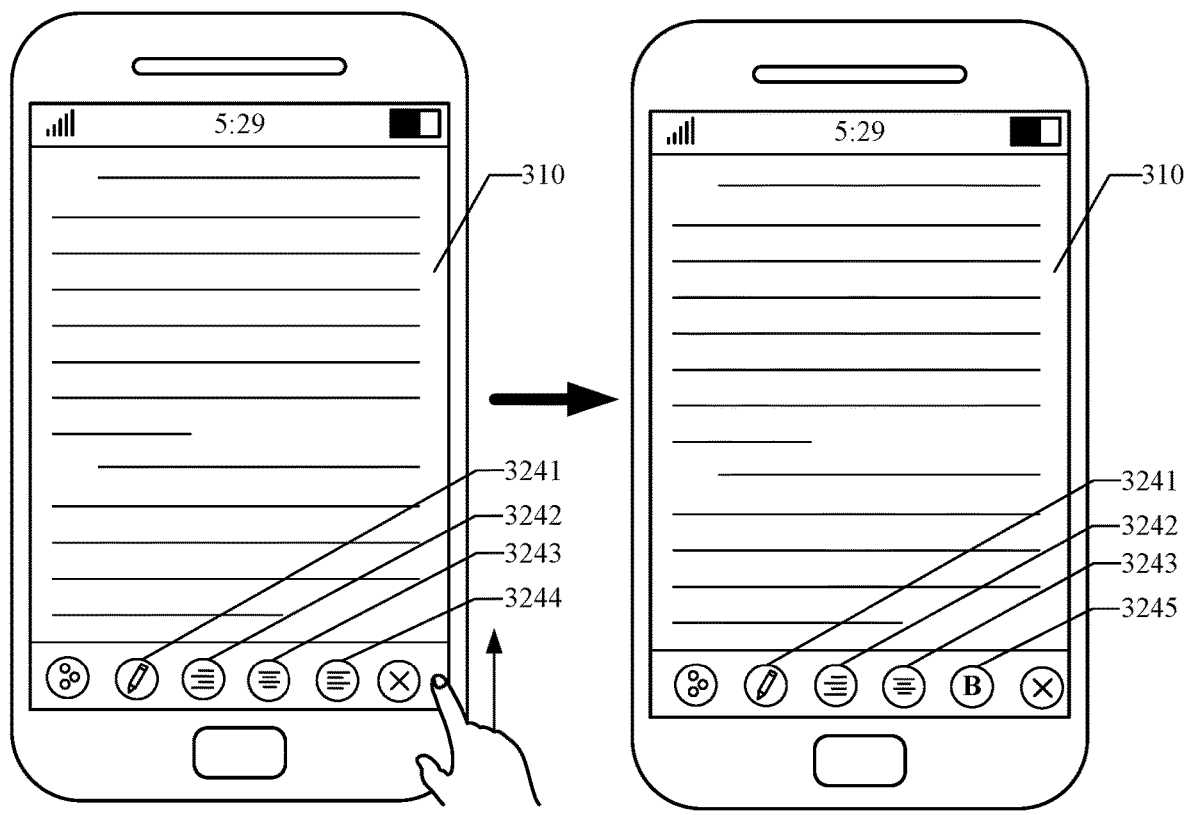
FIG. 3B is another schematic diagram of displaying an editing control provided based on the example shown in FIG. 2.

For example, please refer to FIG. 3B, which is another schematic diagram of displaying an editing control provided based on the example shown in FIG. 2. In FIG. 3B, the total number M of editing controls that need to be displayed in the navigation bar is 5. The number N of editing controls currently displayed in the navigation bar is 4, which are a brush control 3241, a right alignment control 3242, a center alignment control 3243 and a left alignment control 3244 respectively. The fourth operation is to slide upward in the navigation bar. When the operating system detects a fourth operation in the navigation bar, the rightmost one (the left alignment control 3244) of the four editing controls currently displayed in the navigation bar is replaced to display one editing control (bold control 3245) in the five editing controls that have not been displayed before.

Figure 3C:
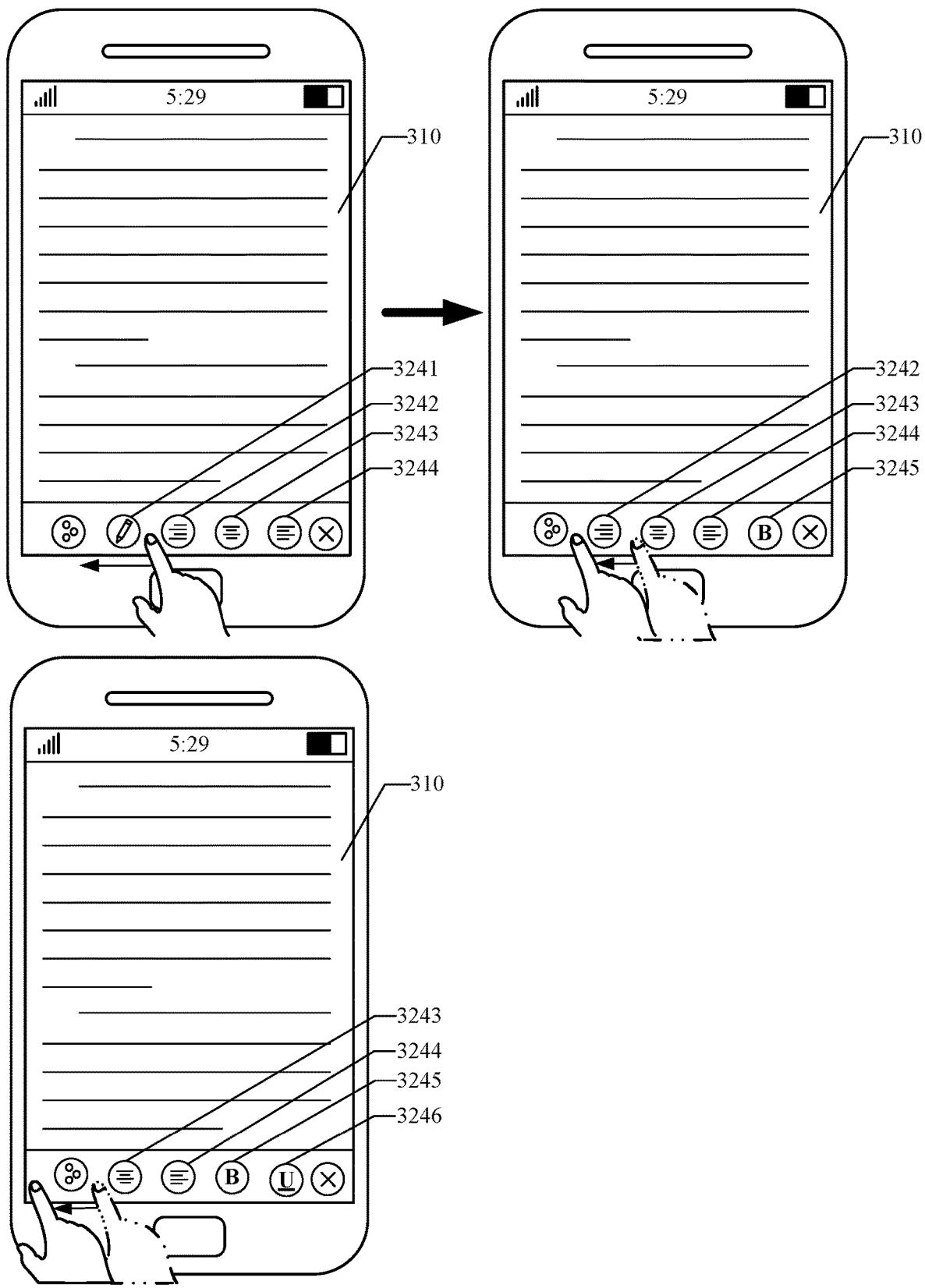
FIG. 3C is a schematic diagram of displaying an editing control provided based on the example shown in FIG. 2.

For another example, please refer to FIG. 3C, which is a schematic diagram of displaying an editing control provided based on the example shown in FIG. 2. In FIG. 3C, the total number M of editing controls that need to be displayed in the navigation bar is 6. The number N of editing controls currently displayed in the navigation bar is 4, which are a brush control 3241, a right alignment control 3242, a center alignment control 3243 and a left alignment control 3244 respectively. The fourth operation is to slide leftward in the navigation bar. A distance slid by the fourth operation may be proportional to a distance moved by the editing control which has been displayed in the navigation bar. In the example, the sliding distance of the fourth operation may be equal to the distance moved by the editing control which has been already displayed in the navigation bar. For example, if the fourth operation moves 1.5 centimeters on the navigation bar, and the left to right length of the editing control occupied in the navigation bar is also 1.5 centimeters, the operating system will move the leftmost one editing control (the brush control 3241) currently displayed in the navigation bar out of the display region of the navigation bar, other editing controls move a distance of one editing control leftward, and one editing control (the bold control 3245) will move in from the rightmost of the navigation bar. Optionally, if the user continues to move to the left by a distance of 1.5 centimeters at this time, the leftmost editing control (the right alignment control 3242) in the navigation bar will also move out of the display region of the navigation bar, and one editing control (the underline control 3246) will move in from the rightmost of the navigation bar.

In step 205, a first signal is received, wherein the first signal is a signal generated according to a first designated operation triggered on the editing control.

In step 206, an editing operation corresponding to the first signal is performed for the editable object.

In the example of the present disclosure, the execution procedure of step 205 is the same as that of step 103, and the execution procedure of step 206 is the same as that of step 104. For details, please refer to the execution procedures of steps 103 and 104, which will not be described herein again.

Figure 3D:
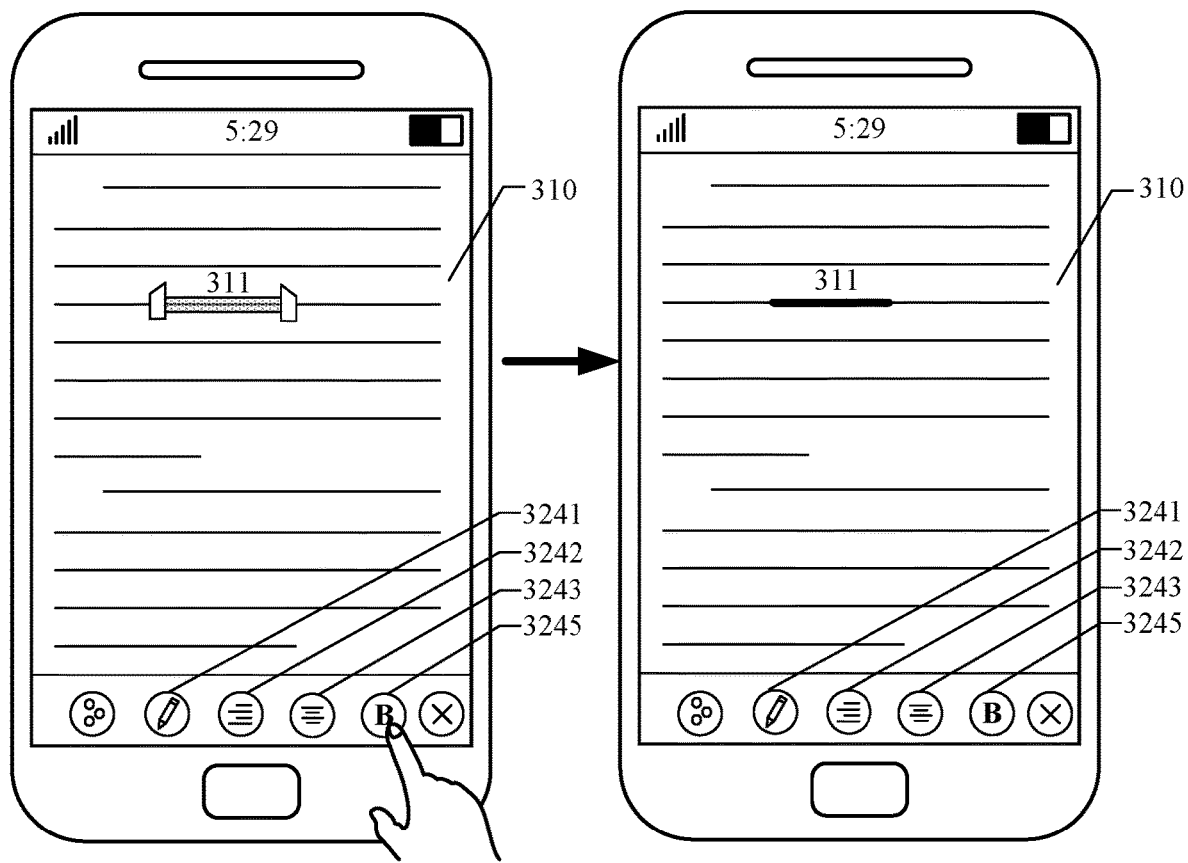
FIG. 3D is a schematic diagram of an editing object provided based on the example shown in FIG. 2.

For ease of understanding, please refer to FIG. 3D, which is a schematic diagram of an editing object provided based on the example shown in FIG. 2. In FIG. 3D, the user selects a part of designated texts 311 in the user interface of the application as an editable object. When the user clicks the bold control 3245, the operating system will make the designated part of texts 311 to be bold. Optionally, the present disclosure may be designed so that, when a long press of the bold control 3245 is received, the operating system will make all the texts in the current user interface 310 to be bold. For example, if a user does not select any text and an operation of long pressing the bold control 3245 is received, the operating system may look all the texts in the current user interface 310 as editable objects in default and make all the texts in the current user interface 310 to be bold.

In step 207, a navigation menu button is displayed in the navigation bar.

In the example of the present disclosure, when n virtual buttons are replaced with editing controls in the navigation bar, the operating system may display the navigation menu button in the navigation bar. The navigation menu button is used to re-unfold the predetermined virtual buttons provided by the display operating system.

Optionally, for ease of operation, the navigation menu button may be displayed in at least one position of the leftmost and rightmost sides of the navigation bar. For example, in order to facilitate control of the user from the left side of the navigation bar, the navigation menu button may be displayed at the leftmost of the navigation bar. Alternatively, in order to facilitate control of the user from the right side of the navigation bar, the navigation menu button may also be displayed at the rightmost of the navigation bar. Alternatively, the navigation menu button may display at the leftmost side of the navigation bar and the rightmost side of the navigation bar at the same time. In the case of simultaneous display, icon patterns of the navigation menu buttons displayed on the leftmost and the rightmost sides may be different patterns or may be the same pattern.

In step 208, a third signal is received, wherein the third signal is a signal generated according to a third designated operation triggered on the navigation menu button.

The operating system may detect the third designated operation of the user for the navigation menu button. Similar to the first designated operation, the third designated operation may be a short press touch, a long press touch, a leftward slide, a rightward slide, an upward slide, a downward slide, or the like.

Optionally, for the terminal capable of distinguishing values of the pressing pressures, the third designated operation may also be an operation of light press, heavy press, or the like.

When the third designated operation is detected, the operating system will receive the third signal generated according to the third designated operation.

In step 209, the editing controls are replaced to display the predetermined virtual buttons according to the third signal.

In the example of the present disclosure, the operating system replaces the editing control to display a predetermined virtual button according to the third signal. That is, when the operating system determines that the user triggers the navigation menu button, the predetermined virtual button originally displayed in the navigation bar is recovered for display, and the editing control is removed out from the navigation bar. At the same time, the operating system will re-display the integration entry in the navigation bar, such that the user may use the editing control again in the navigation bar to edit the editable object.

Figure 3E:
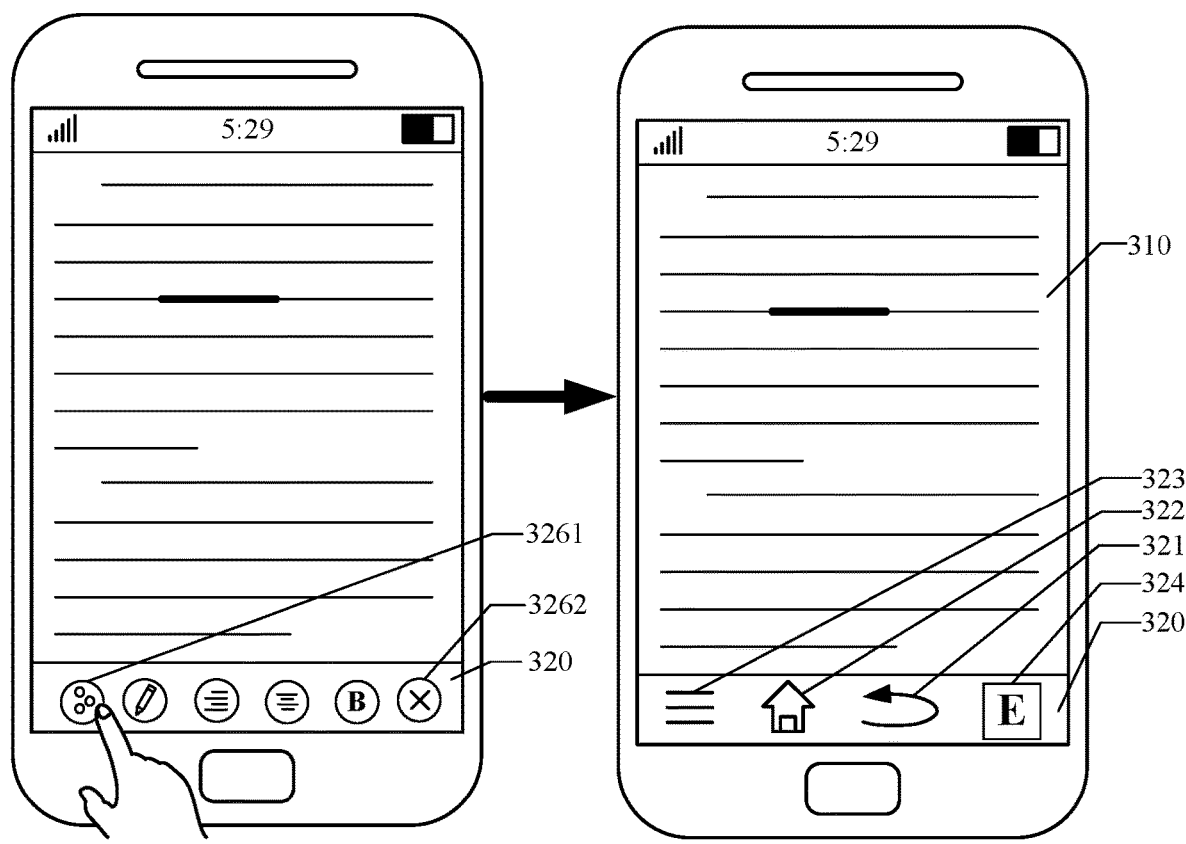
FIG. 3E is a schematic diagram of switching display of a navigation bar provided based on the example shown in FIG. 2.

For example, FIG. 3E is taken as an example, which is a schematic diagram of switching display of a navigation bar provided based on the example shown in FIG. 2. In FIG. 3E, a navigation menu button 3261 and a navigation menu button 3262 are displayed in the navigation bar 320. In the example, the navigation menu button 3261 is displayed in the leftmost region in the navigation bar to facilitate the user operating from the left side, or the navigation menu button 3262 is displayed in the rightmost region of the navigation bar to facilitate the user operating from the right side. When the operating system detects that the navigation menu button 3261 or the navigation menu button 3262 is triggered, the navigation bar is recovered to display a return key 321, a home key 322, a menu key 323 and an integration entry 324.

In summary, in the method for editing an object provided by the example of the present disclosure, by displaying a navigation bar and a user interface of an application, wherein the navigation bar is a control for displaying n virtual buttons provided by an operating system, and n is a positive integer, when an editable object exists in the user interface, an editing control corresponding to the editable object is displayed in the navigation bar, a first signal is received, wherein the first signal is a signal generated according to a first designated operation triggered on the editing control, and an editing operation corresponding to the first signal is performed for the editable object. Since an editing control is additionally displayed in the navigation bar, the user may directly edit the editable object through the edit control on the navigation bar, thereby the operation of opening the editing application and editing the editable object in the editing application may be eliminated. Therefore, the method for editing an object provided by the present disclosure reduces operation of the user and improves human-machine interaction efficiency when the user edits the object.

In addition, when the editable object exists in the user interface, the integration entry on a region other than regions of the n virtual buttons is added and displayed on the navigation bar, wherein the n virtual buttons include at least one of a return key, a home key and a menu key. A second signal is received, wherein the second signal is a signal generated according to a second designated operation triggered on the integration entry. The predetermined virtual buttons of the n virtual buttons are replaced to display editing controls according to the second signal, such that the navigation bar may always display the virtual buttons or controls that the user needs, which improves the space utilization efficiency of the navigation bar.

In addition, when the editing control includes M controls, N first editing controls and M−N second editing controls in the M controls are determined, wherein N is a preset positive integer and M is an integer greater than N. The N first editing controls are displayed in the navigation bar. When a fourth designated operation performed on the navigation bar is detected, Z editing controls in the N first editing controls are replaced to display Z editing controls in the M−N second editing controls, wherein Z is a positive integer and Z is not greater than a smaller one of N and M−N, which improves the switching efficiency of the editing control in the navigation bar.

In addition, a navigation menu button is displayed in the navigation bar. A third signal is received, wherein the third signal is a signal generated according to a third designated operation triggered on the navigation menu button. The editing controls are replaced to display the predetermined virtual buttons according to the third signal. In this way, predetermined virtual buttons of the terminal may be recovered for display after using the editing controls, which improves the usability of the basic functions of the navigation bar.

In the example of the present disclosure, after acquiring the target text copied by the user, the operating system may display a text paste control in the navigation bar, thus achieving the effect of flexibly pasting a sub-text in the target text in a specified position in the editable target. The detailed process may be achieved by the method for editing an object obtained by replacing step 2041 to step 2043 by step 2044, replacing step 205 by step 2051, and replacing the step 206 by step 2061 and step 2062 based on the method for editing an object as shown in FIG. 2.

Figure 4:
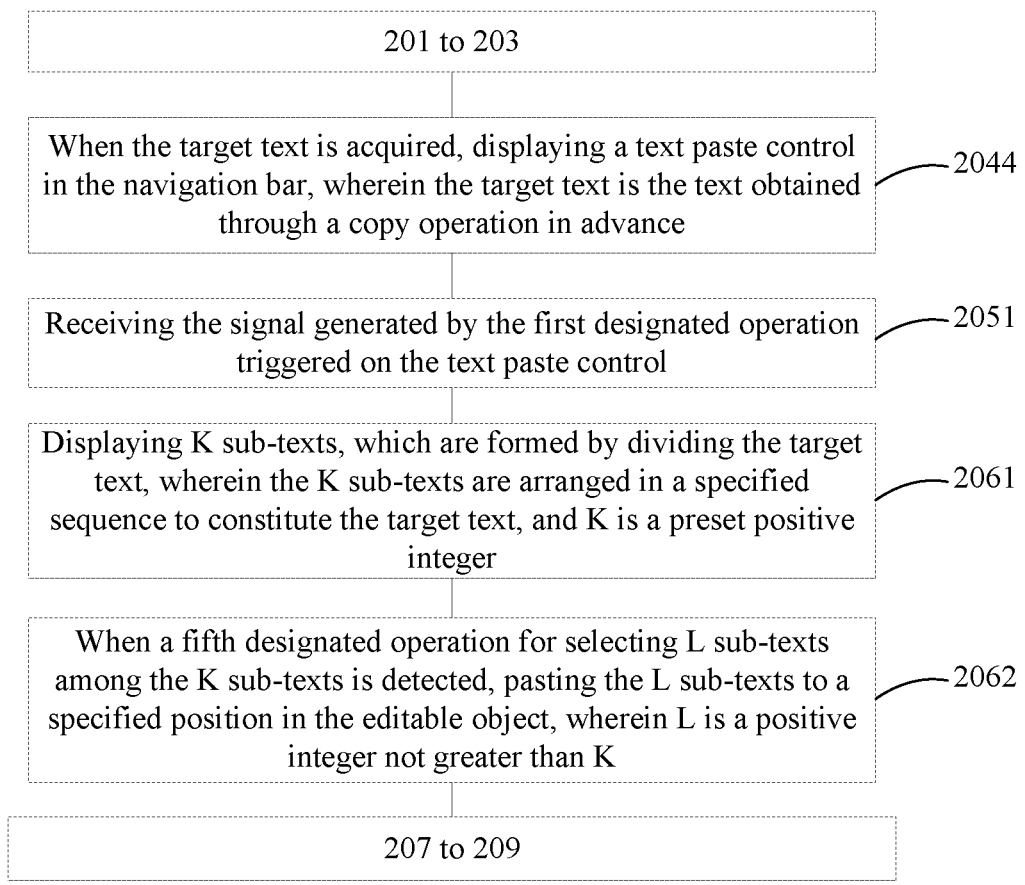
FIG. 4 is another flowchart of a method for editing an object provided by an example of the present disclosure.

For details, please refer to FIG. 4, which is another flowchart of a method for editing an object provided by an example of the present disclosure. The method may also be used in the above terminal. As shown in FIG. 4, the method for editing an object may include following steps.

The operating system executes steps 201 to 203 first. The step 2044, step 2051, step 2061 and step 2062 are performed after the execution of step 203.

In step 2044, when the target text is acquired, a text paste control is displayed in the navigation bar, and the target text is the text obtained through a copy operation in advance.

In the example of the present disclosure, the editing control may be a text paste control, and the editing control is used to paste the target text to a specified position in the editable object. The target text is the text obtained through a copy operation in advance. The operating system may copy the target text through the built-in copy function or the copy function provided by the editing application. After acquiring the target text, the operating system may temporarily store the target text in a memory. In some operating systems, the target text may be saved in an application called a clipboard. In the example, the target text may be a pure text whose content consists of independent characters.

Optionally, the operating system will acquire the target text from the memory or clipboard. When acquiring the target text, the operating system will display the text paste control in the navigation bar. For example, when saving a new text in the memory or the clipboard, the operating system may display the text paste control in the navigation bar. Optionally, the operating system may also display the text paste control in the navigation bar when obtaining the target text and having detected the text paste operation of the user in the editable region. For example, operations such as a short press operation, a long press operation or an operation of selecting a piece of text in the text editing region of the user interface may be set as a text paste operation. The operating system may display the text paste control in the navigation bar after having detected the text paste operation.

In step 2051, the signal generated by the first designated operation triggered on the text paste control is received.

In the example of the present disclosure, the first signal may be a paste signal, and the user may trigger to display the text paste control displayed in the navigation bar through the first designated operation. When the first designated operation is detected, the operating system will receive the paste signal generated according to the first designated operation.

Optionally, in this step, the operating system may set the entirety paste operation and the first designated operation as different types of touch operations, in order to distinguish the above first designated operation and the entirety paste operation for the user to paste the target text to the specified position. For example, the operating system may set the entirety paste operation as a short press operation on the text paste control while set the first designated operation as a long press operation. Alternatively, in the terminal capable of distinguishing values of the pressing pressures, the operating system may set the entirety paste operation as an operation of light press on the text paste control and set the first designated operation as an operation of heavy press. It should be noted that the operation types of the entirety paste operation and the first designated operation are only two manners that may be implemented in the present disclosure, which is not limited thereto.

In step 2061, K sub-texts after dividing the target text are displayed, wherein the K sub-texts are arranged in a specified order to constitute the target text, and K is a preset positive integer.

In the example of the present disclosure, after receiving the paste signal, the operating system may display a sub-text candidate box in the user interface and display K sub-texts in the sub-text candidate box. The K sub-texts herein are sub-texts divided from the target text according to a preset algorithm. That is, after the K sub-texts are arranged in a certain order, they may still constitute the target text. In the example, the preset algorithm may be an algorithm for segmenting words according to grammar rules of the text contained in the target text.

Optionally, in order to block a content of the editable object and the keyboard in the user interface as little as possible when presenting the sub-text candidate frame, the sub-text candidate box in the present disclosure is displayed in the region in the user interface other than regions of the editable object and the keyboard.

For example, the target text is "It was recently found that a newly opened fast food restaurant near the park tastes good". After receiving the paste signal, the operating system divides the target text according to a preset algorithm first. After the division, the sub-texts are "It was recently", "found that", "a newly opened", "fast food restaurant", "near", "the park", "tastes" and "good". Here the value of K is 8, and if the eight sub-texts are combined in the order in which they were divided, they may still be combined into the target text. The operating system may present the 8 sub-texts in the sub-text candidate box in the screen.

In step 2062, when a fifth designated operation for selecting L sub-texts among the K sub-texts is detected, the L sub-texts are pasted to a specified position in the editable object, wherein L is a positive integer not greater than K.

In the example of the present disclosure, the designated position in the editable object may be a position of an input cursor in the editable object in an editable state. Alternatively, the designated position in the editable object may also be the position of the selected text. For example, in the editable object, the text "Hello" is the selected text, and then the position of "Hello" is the above designated position.

In the example of the present disclosure, the fifth designated operation may be a short press touch, a long press touch, a drag operation, a leftward slide, a rightward slide, an upward slide, a downward slide, or the like. Optionally, for the terminal capable of distinguishing values of the pressing pressures, the fifth designated operation may also be an operation of light press, heavy press, or the like. Optionally, for a terminal capable of distinguishing between a palm operation, a hand back operation and a knuckle operation, the fifth designated operation may also be a palm operation, a hand back operation or a knuckle operation.

In a possible implementation manner, the operating system may paste the L sub-texts at the designated position in a sequence that the L sub-texts are selected under the instruction of the fifth designated operation. For example, if the L sub-texts selected by the user in sequence are "fast food restaurant", "tastes" and "good", the operating system will paste the text "fast food restaurant tastes good" at the designated position in a sequence that the they are selected.

In another possible implementation, the operating system may paste the L sub-texts in an order corresponding to that in the target text to the designated position under the instruction of the fifth designated operation. For example, the target text is divided into 8 sub-texts, from beginning to end, they are "It was recently" (1), "found that" (2), "a newly opened" (3), "fast food restaurant" (4), "near" (5), "the park" (6), "tastes" (7) and "good" (8). If the fifth designated operation of the user is to select "good" (8), "the park" (6) and "fast food restaurant" (4) among them, the operating system pastes the text "fast food restaurant the park good" at the designated position, according to the order corresponding to that of the above 3 sub-texts in the target text, i.e., "fast food restaurant" (4), "the park" (6) and "good" (8).

In yet another possible implementation manner, under the instruction of the fifth designated operation, the operating system may rank the L sub-texts according to an algorithm for combining sub-texts and paste the ranked L sub-texts in the specified position. For example, the user's fifth designated operation may select "good", "tastes", "fast food restaurant", "the park" and "near", then the operating system may obtain "fast food restaurant near the park tastes good" according to a preset algorithm for combining sub-texts. In the example, the algorithm for combining sub-texts is an algorithm set according to the syntax of the target text. Optionally, the algorithm for combining sub-texts may be an algorithm having been trained by a large number of sample texts similar to the target text.

It should be noted that, after the operating system performs step 2062, the operating system executes step 207, step 208 and step 209.

Figure 5:
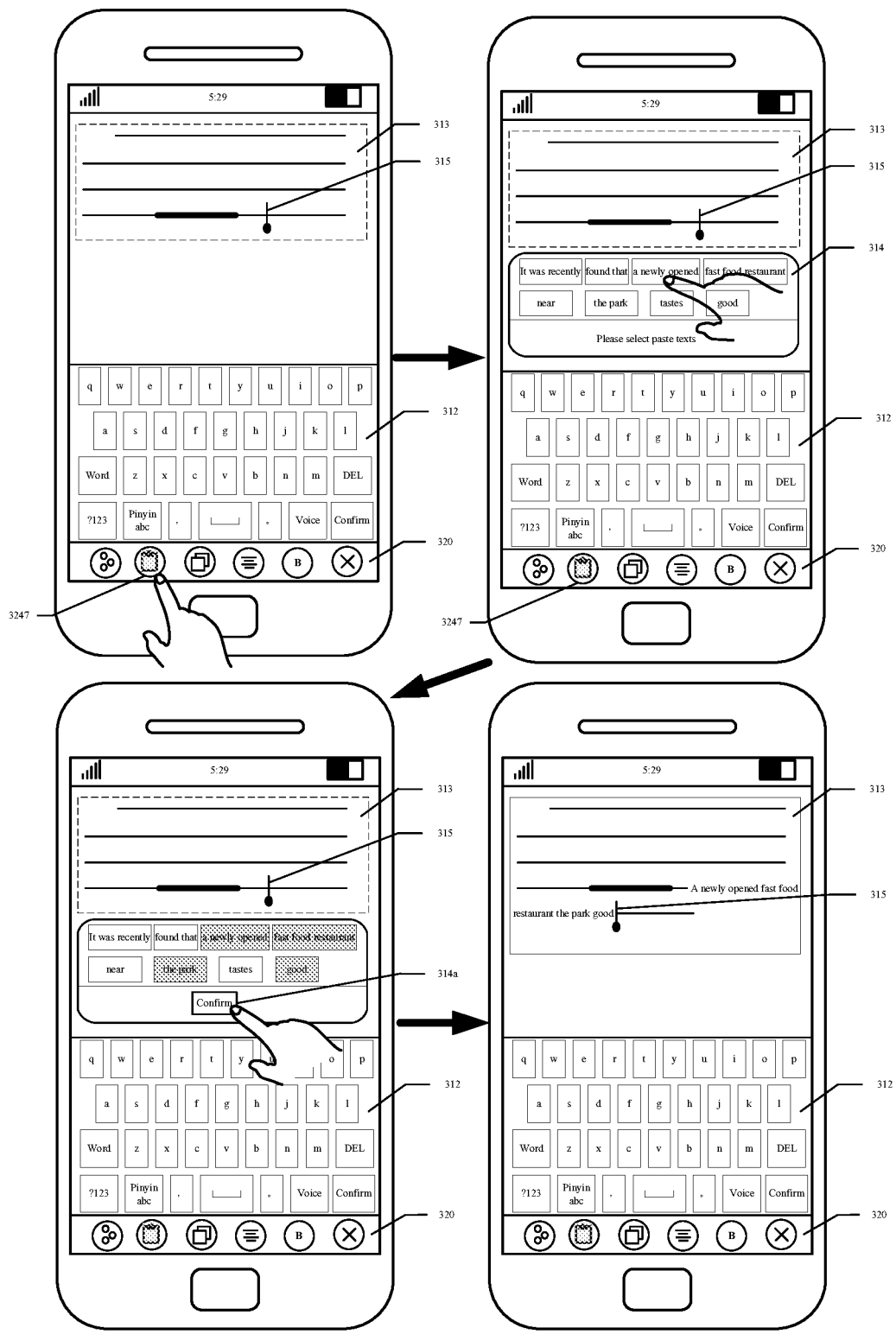
FIG. 5 is a schematic diagram of pasting a text based on the example shown in FIG. 4.

For example, one possible implementation of the present disclosure will be described by taking the terminal being a mobile phone and the operating system being a customized system developed based on the Android system, as an example. For the convenience of description, the customized system developed based on the Android system is represented by a customized system below. Please refer to FIG. 5, which is a schematic diagram of pasting a text based on the example shown in FIG. 4. In FIG. 5, when the customized system saves a new target text "It was recently found that a newly opened fast food restaurant near the park tastes good" in the clipboard, the text paste control 3247 is displayed in the navigation bar 320. When the user clicks the text paste control 3247, the operating system will display the sub-text candidate box 314 in a region in the user interface other than the keyboard region 312 and the region 313 displaying the editable object. The sub-text candidate box 314 displays the sub-texts "It was recently", "found that", "a newly opened", "fast food restaurant", "near", "the park", "tastes" and "good", which are formed by dividing the target text. Optionally, when the operating system does not detect the selection operation of the user for the sub-texts in the sub-text candidate box 314, a prompt text "please select paste texts" may be displayed in the region at the bottom of the text candidate box 314. Optionally, when the operating system detects that there is a sub-text selected by the user, a confirmation button 314*a* will be displayed at the bottom of the text candidate box 314. The confirmation button 314*a* is used to paste the selected sub-text in the designated position 315 of the editable object and close text candidate box 314. In FIG. 5, the user selects four sub-texts of "a newly opened", "fast food restaurant", "the park" and "good" in sequence. When the confirmation button 314*a* is triggered, the operating system will paste the above sub-objects according to the sequence, which the user selects the above sub-objects, at the designated position 315. Optionally, after the text candidate box 314 is closed, the text paste control 3247 in the navigation bar may be hidden or may continue to be displayed.

In summary, in the example of the present disclosure, when the target text is acquired, a text paste control is displayed in the navigation bar. The signal generated by the first designated operation triggered on the text paste control is received. K sub-texts, which are formed by dividing the target text, are displayed, wherein the K sub-texts are arranged in a specified sequence to constitute the target text. When a fifth designated operation for selecting L sub-texts among the K sub-texts is detected, the L sub-texts are pasted to a specified position in the editable object, wherein L is a positive integer not greater than K. Since the operating system may display the text paste control in the navigation bar, display the K sub-texts, which are formed by dividing the target text, after the text paste control is triggered, and paste the L sub-texts in the K sub-texts to the specified position in the editable object through the operation from the user, which enables the function of flexibly pasting some of the text in the copied text, the flexibility of pasting the text is improved.

Figure 6:
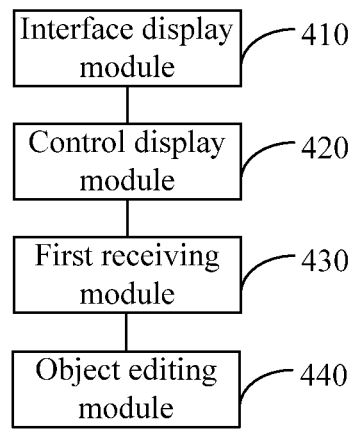
FIG. 6 is a structural block diagram of an apparatus for editing an object according to an example.

Please refer to FIG. 6, which is a structural block diagram of an apparatus for editing an object according to an example. The functions of the apparatus may be implemented by pure hardware or may be implemented by implementing corresponding software by hardware, thereby the steps listed in FIG. 1, FIG. 2 or FIG. 4 may be realized. As shown in FIG. 6, the apparatus for editing an object may include: an interface display module 410, a control display module 420, a first receiving module 430 and an object editing module 440.

The interface display module 410 is configured to display a navigation bar and a user interface of an application, wherein the navigation bar is a control for displaying n virtual buttons provided by an operating system, and n is a positive integer.

The control display module 420 is configured to, when an editable object exists in the user interface, display an editing control corresponding to the editable object in the navigation bar.

The first receiving module 430 is configured to receive a first signal, wherein the first signal is a signal generated according to a first designated operation triggered on the editing control.

The object editing module 440 is configured to perform an editing operation corresponding to the first signal for the editable object.

Figure 7:
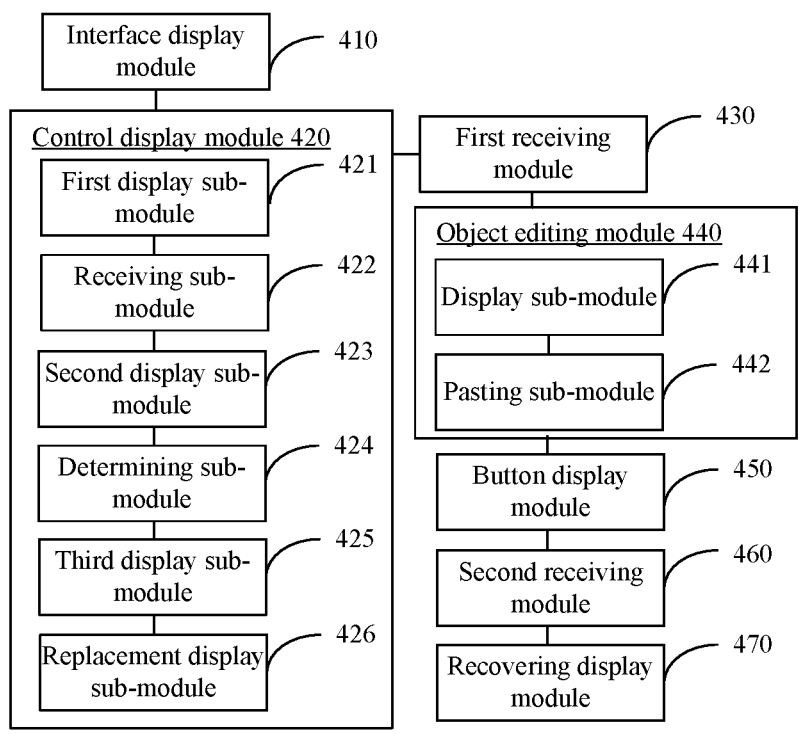
FIG. 7 is another structural block diagram of an apparatus for editing an object according to an example.

Further, please refer to FIG. 7, which is another structural block diagram of an apparatus for editing an object according to an example. With reference to FIG. 6, in the apparatus shown in FIG. 7:

optionally, the control display module 420 includes: a first display sub-module 421, a receiving sub-module 422 and a second display sub-module 423.

The first display sub-module 421 is configured to, when an editable object exists in the user interface, display an integration entry in the navigation bar.

The receiving sub-module 422 is configured to receive a second signal, wherein the second signal is a signal generated according to a second designated operation triggered on the integration entry.

The second display sub-module 423 is configured to display at least two of the editing controls in the navigation bar according to the second signal.

Optionally, the first display sub-module 421 is configured to, when the editable object exists in the user interface, add and display the integration entry on a region other than regions of the n virtual buttons on the navigation bar, and the n virtual buttons include at least one of a return key, a home key and a menu key.

Optionally, the second display sub-module 423 is configured to replace predetermined virtual buttons of the n virtual buttons to display at least two of the editing controls according to the second signal.

Optionally, the apparatus further includes: a button display module 450, a second receiving module 460 and a recovering display module 470.

The button display module 450 is configured to display a navigation menu button in the navigation bar.

The second receiving module 460 is configured to receive a third signal, wherein the third signal is a signal generated according to a third designated operation triggered on the navigation menu button.

The recovering display module 470 is configured to replace at least two of the editing controls to display the predetermined virtual buttons according to the third signal.

Optionally, the control display module 420 includes: a determining sub-module 424, a third display sub-module 425 and a replacement display sub-module 426.

The determining sub-module 424 is configured to, when the editing control includes M controls, determine N first editing controls and M−N second editing controls in the M controls, wherein N is a preset positive integer and M is an integer greater than N.

The third display sub-module 425 is configured to display the N first editing controls in the navigation bar.

The replacement display sub-module 426 is configured to, when a fourth designated operation performed on the navigation bar is detected, replace Z editing controls in the N first editing controls to display Z editing controls in the M−N second editing controls, wherein Z is a positive integer and Z is not greater than a smaller one of N and M−N.

Optionally, the editing control is configured to paste a target text to a designated position in the editable object, wherein the target text is a text obtained through a copying operation in advance, and the object editing module 440 includes: a display sub-module 441 and a pasting sub-module 442.

The display sub-module 441 is configured to display K sub-texts, which are formed by dividing the target text, wherein the K sub-texts are arranged in a specified sequence to constitute the target text, and K is a preset positive integer.

The pasting sub-module 442 is configured to, when a fifth designated operation for selecting L sub-texts among the K sub-texts is detected, paste the L sub-texts to a specified position in the editable object, wherein L is a positive integer not greater than K.

Optionally, the editable object is an object in an editable state in the user interface displayed by the application, or the editable object is all objects of a specified type in the user interface displayed by the application.

Optionally, the editable object includes at least one of a text type object, a picture type object, an audio type object and a video type object, and the editing control includes: at least one of a text pasting control, a bold control, a left alignment control, a right alignment control, a center alignment control and a brush control.

Please see the above method example for related details.

An example of the present disclosure further provides another apparatus for editing an object, which may achieve the method for editing an object provided by the present disclosure. The apparatus includes: a processor; and a memory for storing processor executable instructions, wherein the processor is configured to performing:

displaying a navigation bar and a user interface of an application, wherein the navigation bar is a control for displaying n virtual buttons provided by an operating system, and n is a positive integer;

when an editable object exists in the user interface, displaying an editing control corresponding to the editable object in the navigation bar;

receiving a first signal, wherein the first signal is a signal generated according to a first designated operation triggered on the editing control; and performing an editing operation corresponding to the first signal for the editable object.

Optionally, when an editable object exists in the user interface, the displaying an editing control corresponding to the editable object in the navigation bar includes:

when an editable object exists in the user interface, displaying an integration entry in the navigation bar;

receiving a second signal, wherein the second signal is a signal generated according to a second designated operation triggered on the integration entry; and displaying at least two of the editing controls in the navigation bar according to the second signal.

Optionally, when an editable object exists in the user interface, the displaying an integration entry in the navigation bar includes:

when the editable object exists in the user interface, adding and displaying the integration entry on a region other than regions of the n virtual buttons on the navigation bar, wherein the n virtual buttons include at least one of a return key, a home key and a menu key;

the displaying at least two of the editing controls in the navigation bar according to the second signal includes:

replacing predetermined virtual buttons of the n virtual buttons to display at least two of the editing controls according to the second signal.

Optionally, the apparatus is further configured to perform:
displaying a navigation menu button in the navigation bar;
receiving a third signal, wherein the third signal is a signal generated according to a third designated operation triggered on the navigation menu button; and
replacing at least two of the editing controls to display the predetermined virtual buttons according to the third signal.

Optionally, when an editable object exists in the user interface, the displaying an editing control corresponding to the editable object in the navigation bar includes:
when the editing control includes M controls, determining N first editing controls and M−N second editing controls in the M controls, wherein N is a preset positive integer and M is an integer greater than N;
displaying the N first editing controls in the navigation bar;
when a fourth designated operation performed on the navigation bar is detected, replacing Z editing controls in the N first editing controls to display Z editing controls in the M−N second editing controls, wherein Z is a positive integer and Z is not greater than a smaller one of N and M−N.

Optionally, the editing control is configured to paste a target text to a designated position in the editable object, wherein the target text is a text obtained through a copying operation in advance, and the performing an editing operation corresponding to the first signal for the editable object includes:
displaying K sub-texts, which are formed by dividing the target text, wherein the K sub-texts are arranged in a specified order to constitute the target text, and K is a preset positive integer; and
when a fifth designated operation for selecting L sub-texts among the K sub-texts is detected, pasting the L sub-texts to a specified position in the editable object, wherein L is a positive integer not greater than K.

Optionally, the editable object is an object in an editable state in the user interface displayed by the application; or
the editable object is all objects of a specified type in the user interface displayed by the application.

Optionally, the editable object includes at least one of a text type object, a picture type object, an audio type object, or a video type object;
the editing control includes: at least one of a text pasting control, a bold control, a left alignment control, a right alignment control, a center alignment control and a brush control.

It should be noted that when the apparatus for editing an object provided by the above examples performs the method for editing an object, functions are performed by corresponding modules which are divided as shown in the drawings, and however in practical applications, the functions can be assigned to different modules, that is, the structure of the device can be divided into different functional modules to perform whole or a part of the functions.

With respect to the apparatuses in the above examples, the specific manners for performing operations for individual modules therein have been described in detail in the examples regarding the methods, which will not be elaborated herein.

Figure 8:
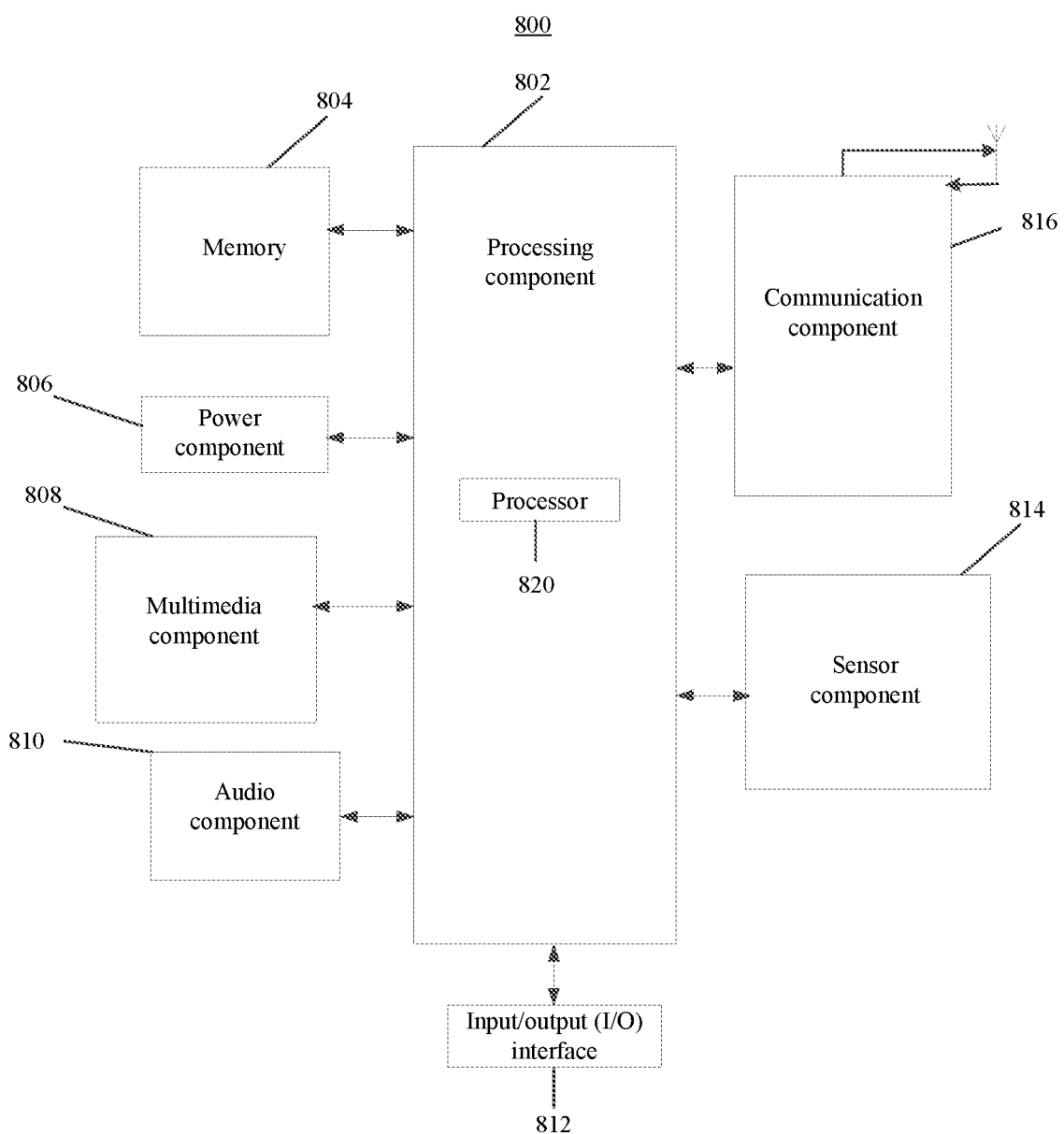
FIG. 8 is a block diagram of an apparatus 800 shown according to an example.

Please refer to FIG. 8, which is a block diagram of an apparatus 800 shown according to an example. For example, the apparatus 800 may be a terminal. In FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operations of the apparatus 800. Examples of such data include instructions for any applications or methods operated on the apparatus 800, contact data, phonebook data, messages, pictures, video, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In examples, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or sent via the communication component 816. In examples, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide state assessments of various aspects of the apparatus 800. For instance, the sensor component 814 may detect an open/closed state of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may further include a light sensor, such as a CMOS or CCD image sensor, for use in imaging applications. In examples, the sensor component 814 may further include an accelerometer sensor, a gyroscope sensor, a magnetic sensor, a pressure sensor or a temperature sensor.

The communication component 816 is configured to facilitate communication, wired or wirelessly, between the apparatus 800 and other devices. The apparatus 800 may access a wireless network based on a communication standard, such as WiFi, 2G, or 3G, or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method for editing an object as shown in FIG. 1, FIG. 2 or FIG. 4.

Persons of ordinary skill in the art may understand that all or part of the steps of implementing the foregoing examples may be implemented by hardware, or may be accomplished through program instructions in combination with associated hardware, and the program instructions may be stored in a storage device. A computer-readable storage medium is included in the storage device. The above-mentioned storage medium may be a read-only memory, a solid state drive (SSD), a flash memory, a magnetic disk, or an optical disk. When instructions in the computer-readable storage medium are executed by the processor 820 of the terminal, the terminal is enabled to execute the method for editing an object shown in FIG. 1, FIG. 2, or FIG. 4 described above.

The technical scheme provided by examples of the present disclosure may have the beneficial effects.

For example, by displaying a navigation bar and a user interface of an application, where the navigation bar is a control for displaying n virtual buttons provided by an operating system, and n is a positive integer; when an editable object exists in the user interface, displaying an editing control corresponding to the editable object in the navigation bar; receiving a first signal, wherein the first signal is a signal generated according to a first designated operation triggered on the editing control; and performing an editing operation corresponding to the first signal for the editable object.

Since an editing control is additionally displayed in the navigation bar, the user may directly edit the editable object through the edit control on the navigation bar, thereby the operation of opening the editing application and editing the editable object in the editing application may be eliminated. Therefore, the method for editing an object provided by the present disclosure reduces operation of the user and improves human-machine interaction efficiency when the user edits the object. Thus, the present disclosure does not need to open the editing application to edit editable objects in the editing application. Instead, editing control interfaces corresponding to the editable objects in the user interface are directly displayed in a navigation bar.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure may be apparent to those skilled in the art from consideration of the specification and practice of the disclosure disclosed here. This application is intended to cover any variations, uses, or adoptions of the disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes can be made without departing from the scope thereof.

What is claimed is:

1. A method for editing an object, wherein the method comprises:

displaying a navigation bar and a user interface of an application in a terminal device, wherein the navigation bar is a control for displaying n virtual buttons provided by an operating system of the terminal device, and n is a positive integer;

when the operating system identifies an attribute of an object in the user interface and determines that the object is an editable object by recognizing information of the attribute of the object, displaying an editing control interface corresponding to the editable object in the navigation bar;

receiving a first signal, wherein the first signal is generated according to a first designated operation triggered by the editing control interface;

performing an editing operation corresponding to the first signal for the editable object; and in response to determining that the editable object identified by the operating system exists in the user interface, adding and displaying an integration entry on a region other than regions for the n virtual buttons on the navigation bar such that the editing controls that need to be displayed in the navigation bar are integrated.

2. The method according to claim 1, wherein displaying the editing control interface corresponding to the editable object in the navigation bar comprises:
receiving a second signal, wherein the second signal is generated according to a second designated operation triggered by the integration entry; and
displaying at least two of the editing control interfaces in the navigation bar according to the second signal.

3. The method according to claim 2, wherein displaying the integration entry in the navigation bar comprises:
when the editable object exists in the user interface, adding and displaying the integration entry on a region other than regions for the n virtual buttons on the navigation bar, wherein the n virtual buttons comprises at least one of: a return key, a home key and a menu key; and
displaying at least two of the editing control interfaces in the navigation bar according to the second signal comprises:
replacing predetermined virtual buttons of the n virtual buttons to display at least two of the editing control interfaces according to the second signal.

4. The method according to claim 3, wherein the method further comprises:
displaying a navigation menu button in the navigation bar;
receiving a third signal, wherein the third signal is generated according to a third designated operation triggered by the navigation menu button; and
replacing at least two of the editing control interfaces to display the predetermined virtual buttons according to the third signal.

5. The method according to claim 1, wherein displaying the editing control interface corresponding to the editable object in the navigation bar comprises:
when the editing control interface comprises M control interfaces, determining N first editing control interfaces and M−N second editing control interfaces in the M control interfaces, wherein N is a preset positive integer and M is an integer greater than N;
displaying the N first editing control interfaces in the navigation bar; and
when a fourth designated operation performed on the navigation bar is detected, replacing Z editing control interfaces in the N first editing control interfaces to display Z editing control interfaces in the M−N second editing control interfaces, wherein Z is a positive integer and Z is not greater than a smaller one of N and M−N.

6. The method according to claim 1, wherein the editing control interface is configured to paste a target text to a designated position in the editable object, and the target text is obtained through a copying operation in advance, and performing the editing operation corresponding to the first signal for the editable object comprises:
displaying K sub-texts which are formed by dividing the target text, wherein the K sub-texts are arranged in a specified sequence to constitute the target text, and K is a preset positive integer; and
when a fifth designated operation for selecting L sub-texts among the K sub-texts is detected, pasting the L sub-texts to a specified position in the editable object, wherein L is a positive integer not greater than K.

7. The method according to claim 1, wherein
the editable object is in an editable state in the user interface displayed by the application; or
the editable object is all objects of a specified type in the user interface displayed by the application.

8. The method according to claim 1, wherein
the editable object comprises at least one of: a text type object, a picture type object, an audio type object and a video type object; and
the editing control interface comprises: at least one of a text pasting control, a bold control, a left alignment control, a right alignment control, a center alignment control and a brush control.

9. An apparatus for editing an object, wherein the apparatus comprises:
a processor; and
a memory for storing processor executable instructions, wherein the processor is configured to:
display a navigation bar and a user interface of an application in a terminal device, wherein the navigation bar is a control for displaying n virtual buttons provided by an operating system of the terminal device, and n is a positive integer;
when the operating system identifies an attribute of an object in the user interface and determines that the object is an editable object by recognizing information of the attribute of the object, display an editing control interface corresponding to the editable object in the navigation bar;
receive a first signal, wherein the first signal is generated according to a first designated operation triggered by the editing control interface;
perform an editing operation corresponding to the first signal for the editable object; and
in response to determining that the editable object identified by the operating system exists in the user interface, add and display an integration entry on a region other than regions for the n virtual buttons on the navigation bar such that the editing controls that need to be displayed in the navigation bar are integrated.

10. The apparatus according to claim 9, wherein the processor is further configured to:
receive a second signal, wherein the second signal is generated according to a second designated operation triggered by the integration entry; and
display at least two of the editing control interfaces in the navigation bar according to the second signal.

11. The apparatus according to claim 10, wherein the processor is further configured to:
when the editable object exists in the user interface, add and display the integration entry on a region other than regions for the n virtual buttons on the navigation bar, wherein the n virtual buttons comprises at least one of: a return key, a home key and a menu key; and
replace predetermined virtual buttons of the n virtual buttons to display at least two of the editing control interfaces according to the second signal.

12. The apparatus according to claim 11, wherein the processor is further configured to:
display a navigation menu button in the navigation bar;
receive a third signal, wherein the third signal is generated according to a third designated operation triggered by the navigation menu button; and
replace at least two of the editing control interfaces to display the predetermined virtual buttons according to the third signal.

13. The apparatus according to claim 9, wherein the processor is further configured to:

when the editing control comprises M control interfaces, determine N first editing control interfaces and M−N second editing control interfaces in the M control interfaces, wherein N is a preset positive integer and M is an integer greater than N;

display the N first editing control interfaces in the navigation bar; and when a fourth designated operation performed on the navigation bar is detected, replace Z editing control interfaces in the N first editing control interfaces to display Z editing control interfaces in the M−N second editing control interfaces, wherein Z is a positive integer and Z is not greater than a smaller one of N and M−N.

14. The apparatus according to claim 9, wherein the editing control interface is configured to paste a target text to a designated position in the editable object, the target text is obtained through a copying operation in advance, and the processor is further configured to:

display K sub-texts, which are formed by dividing the target text, wherein the K sub-texts are arranged in a specified sequence to constitute the target text, and K is a preset positive integer; and when a fifth designated operation for selecting L sub-texts among the K sub-texts is detected, paste the L sub-texts to a specified position in the editable object, wherein L is a positive integer not greater than K.

15. The apparatus according to claim 9, wherein the editable object is in an editable state in the user interface displayed by the application; or the editable object is all objects of a specified type in the user interface displayed by the application.

16. The apparatus according to claim 9, wherein the editable object comprises at least one of: a text type object, a picture type object, an audio type object and a video type object; and the editing control interface comprises: at least one of a text pasting control, a bold control, a left alignment control, a right alignment control, a center alignment control and a brush control.

17. A non-transitory computer-readable storage medium, wherein at least one instruction is stored in the computer-readable storage medium, and the instruction is loaded and executed by a processor to implement:

displaying a navigation bar and a user interface of an application in a terminal device, wherein the navigation bar is a control for displaying n virtual buttons provided by an operating system of the terminal device, and n is a positive integer;

when the operating system identifies an attribute of an object in the user interface and determines that the object is an editable object by recognizing information of the attribute of the object, displaying an editing control interface corresponding to the editable object in the navigation bar;

receiving a first signal, wherein the first signal is generated according to a first designated operation triggered by the editing control interface;

performing an editing operation corresponding to the first signal for the editable object; and in response to determining that the editable object identified by the operating system exists in the user interface, adding and displaying an integration entry on a region other than regions for the n virtual buttons on the navigation bar such that the editing controls that need to be displayed in the navigation bar are integrated.

18. The non-transitory computer-readable storage medium according to claim 17, wherein the instruction loaded and executed by the processor to implement displaying the editing control interface corresponding to the editable object in the navigation bar is loaded and executed by the processor to implement:

receiving a second signal, wherein the second signal is generated according to a second designated operation triggered by the integration entry; and displaying at least two of the editing control interfaces in the navigation bar according to the second signal.

19. The non-transitory computer-readable storage medium according to claim 18, wherein the instruction loaded and executed by the processor to implement displaying the integration entry in the navigation bar is loaded and executed by the processor to implement:

when the editable object exists in the user interface, adding and displaying the integration entry on a region other than regions for the n virtual buttons on the navigation bar, wherein the n virtual buttons comprises at least one of: a return key, a home key and a menu key; and displaying at least two of the editing control interfaces in the navigation bar according to the second signal comprises:

replacing predetermined virtual buttons of the n virtual buttons to display at least two of the editing control interfaces according to the second signal.

20. The non-transitory computer-readable storage medium according to claim 19, wherein the instruction is further loaded and executed by the processor to implement:

displaying a navigation menu button in the navigation bar;

receiving a third signal, wherein the third signal is generated according to a third designated operation triggered by the navigation menu button; and replacing at least two of the editing control interfaces to display the predetermined virtual buttons according to the third signal.

* * * * *